United States Patent [19]
Gardner et al.

[11] Patent Number: 5,738,955
[45] Date of Patent: Apr. 14, 1998

[54] DEEP-DISCHARGE BATTERY SEPARATOR

[75] Inventors: Thomas N. Gardner, Horseheads, N.Y.; Alvin J. Salkind, Princeton, N.J.; John L. Stempin, Beaver Dams; Dale R. Wexell, Corning, both of N.Y.

[73] Assignee: Corning Incorporated, Corning, N.Y.

[21] Appl. No.: 679,693

[22] Filed: Jul. 11, 1996

Related U.S. Application Data

[60] Provisional application No. 60/005,429, Oct. 23, 1995.
[51] Int. Cl.⁶ .................................................. H01M 2/18
[52] U.S. Cl. ........................ 429/140; 429/142; 429/247
[58] Field of Search ............................. 429/140, 142, 429/225, 228, 247

[56] References Cited

U.S. PATENT DOCUMENTS

| | | |
|---|---|---|
| Re. 15,067 | 3/1921 | Baird et al. . |
| 3,379,570 | 4/1968 | Berger et al. . |
| 3,446,668 | 5/1969 | Arrance et al. . |
| 3,446,669 | 5/1969 | Arrance et al. . |
| 3,489,610 | 1/1970 | Berger et al. . |
| 3,607,403 | 9/1971 | Arrance . |
| 3,647,542 | 3/1972 | Berger . |
| 3,661,644 | 5/1972 | Arrance . |
| 4,160,068 | 7/1979 | Kummer . |
| 4,648,177 | 3/1987 | Uba et al. ................................ 29/623.2 |
| 5,112,703 | 5/1992 | Koenig ..................................... 429/103 |
| 5,126,218 | 6/1992 | Clarke ...................................... 429/245 |
| 5,208,121 | 5/1993 | Yahnke et al. . |
| 5,342,709 | 8/1994 | Yahnke et al. . |
| 5,510,211 | 4/1996 | Sundberg et al. ........................ 429/210 |

FOREIGN PATENT DOCUMENTS 042155  7/1968  Japan .

Primary Examiner—M. Nuzzolillo
Attorney, Agent, or Firm—Milton M. Peterson

[57] ABSTRACT

A tubular, rigid, porous, ceramic separator for a rechargeable, deep-discharge battery assembly, the separator having a porosity greater than 40%. A plurality of battery cells, each embodying such separators, are assembled with a common terminal to form the positive electrode in a motive traction battery.

18 Claims, 1 Drawing Sheet

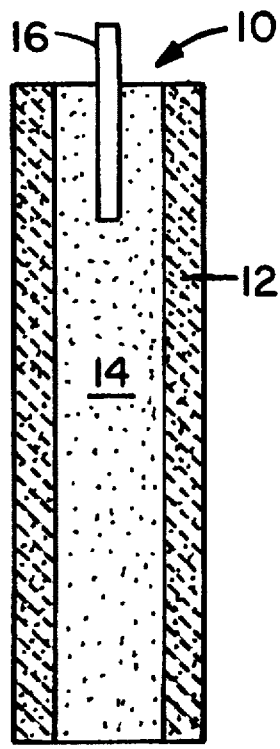
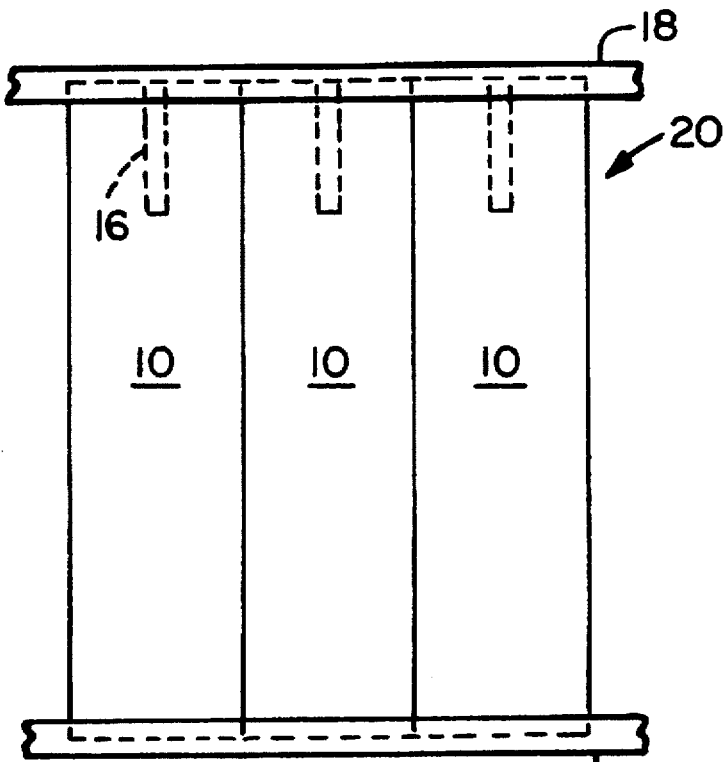
Fig. 1  Fig. 2
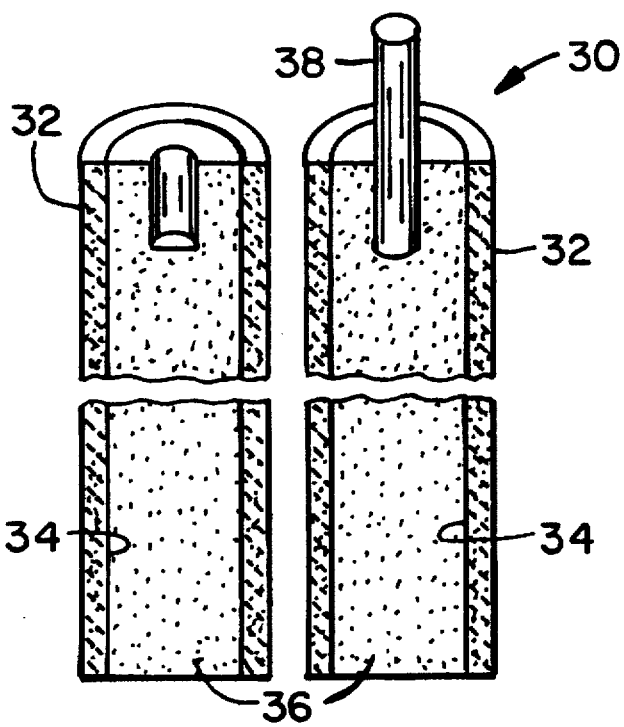
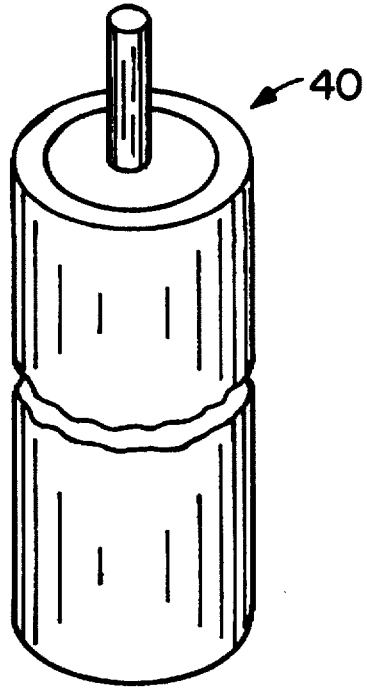
Fig. 3  Fig. 4

DEEP-DISCHARGE BATTERY SEPARATOR

This application claims the benefit of U.S. Provisional Application No. 60/005,834, filed Oct. 23, 1995, entitled DEEP-DISCHARGE BATTERY SEPARATOR, by Thomas N. Gardner, Alvin J. Salkind, John L. Stempin and Dale R. Wexell.

RELATED APPLICATIONS

This application is related to Ser. No. 08/491,766 filed Jun. 19, 1995 and Ser. No. 08/506,713 filed Jul. 26, 1995, both filed in the names of J. L. Stempin, R. L. Stewart, and D. R. Wexell and assigned to the assignee of this application now issued as U.S. Pat. Nos. 5,514,494 and 5,554,464, respectively. The former is directed to a rigid, porous, ceramic battery separator having a porosity of 40–90%, a pore size of 0.1–25 microns, a thickness of 1–12 mm and resistance to acid attack. the latter is directed to a rigid, ceramic separator for a rechargeable battery assembly, the separator having a honeycomb structure in which open cells are separated from adjacent cells by thin porous walls running lengthwise of the honeycomb and the open cells and pores being filled with electrolyte to permit in ion flow between battery electrodes.

FIELD OF THE INVENTION

Deep-discharge batteries and tubular, porous, ceramic battery separators for such batteries.

BACKGROUND OF THE INVENTION

The oldest and best known type of rechargeable battery is the lead-acid battery. The present invention is primarily concerned with heavy duty batteries of this type designed to provide deep-discharge. In particular, it is directed to tubular separators for use in such batteries.

Heavy duty, lead-acid batteries are commonly used as the power source in fork trucks, golf carts, other electrically powered road and service vehicles and in marine applications, such as boats, ships and submarines. Both tubular and flat plate battery designs are used for this type battery. The present application is concerned with the former design, that is, the tubular design. In particular, it is directed at tubular separators for use as a component in such deep-discharge batteries.

Presently, the positive plates in a tubular battery consist of a series of parallel, porous tubes. Each tube has a centralized lead conductor surrounded by active material. The tubes are presently made from woven, braided, or felted fibers. Such materials are resistant to acid attack and to the oxidizing environment of lead-acid batteries. However, they lack structural integrity and do not lend themselves to convenient, automated manufacture.

An integrated cell for a heavy duty, deep-discharge battery normally consists of several tubes. These may be employed individually, or, alternatively, they may be joined together in what is known as a gauntlet construction. This construction integrates several individual tubes into a single structure. The tubes are mounted at their base with a plastic bottom bar. Conventional negative electrodes and separators may be used to complete the tubular design battery.

The important consideration for deep-discharge, deep-cycling batteries for traction applications is maximum cycle life with high energy density. However, light weight is not always desirable in certain applications. For example, a forklift battery must be heavy, because the weight of the battery is generally used to counterbalance the payload. The life of these batteries is increased by employing thick plates with high paste density, a high temperature cure with high humidity, low electrolyte density, high quality, organic-based separators, and one or more layers of glass fiber matting.

The flat pasted (Faure) positive plate is typical for deep cycling batteries in the United States. However, some cycling batteries in the United States, and most cycling batteries in the rest of the world, are built with tubular or gauntlet type positives. the tubular construction minimizes both grid corrosion and shedding of active material. Flat-pasted negative plates are used in conjunction with these positives, and the cells are of the outside-negative design. Batteries for traction and deep-cycle applications have similar performance with either pasted or tubular positive plates. However, the tubular or gauntlet plates show lower polarization losses because of the larger active surface area, better retention of the positive active material, and reduced loss on idle or stand.

The present invention provides an extruded, ceramic, tubular separator to replace the current woven fiber gauntlet and the glass mat separator.

SUMMARY OF THE INVENTION

The present invention resides in a porous, rigid, ceramic, tubular separator for a tubular, deep-discharge (deep cycling) battery. It further resides in a deep-discharge tubular battery embodying such tubular bodies as separators.

PRIOR ART

Prior art known to applicants and deemed to be relevant is provided separately.

BRIEF DESCRIPTION OF THE DRAWINGS

In the accompanying drawings,

FIG. 1 is a side view in cross-section of a single, tubular battery cell in accordance with the invention.

FIG. 2 is a partial side view of an integrated positive cell for a deep-discharge battery in accordance with the invention.

FIG. 3 is an exploded side view depicting a modified form of the invention.

FIG. 4 is a perspective view of the modified form of FIG. 3.

DESCRIPTION OF THE INVENTION

Our present invention adopts the basic structural features of current heavy duty, deep-discharge, tubular cell batteries. In such batteries, the positive plates consist of a series of parallel porous tubes. Each tube has a centralized lead conductor surrounded by active material. The tubes are presently made from woven, braided, or felted fibers which are resistant to the acid electrolyte and to the oxidizing environment of lead-acid batteries. The tubes may be used individually. Alternatively, they may be stitched together, (gauntlet construction) to produce a single structure with several tubes. The tubes are sealed at their base with a plastic bottom bar. Conventional negative electrodes and separators are used to complete the tubular design battery.

The present invention is primarily concerned with providing an improved tubular separator for a deep-discharge battery. Therefore, reference is made to the prior art for details regarding construction and operating characteristics for this type of battery. A typical description may be found at pages 219–227 of a text by Clive D. S. Tuck entitled "Modern Battery Technology" and published by Ellis Horwood (1991).

Our invention arises from the concept of employing porous, ceramic, tubular bodies as separators in deep-discharge batteries. These ceramic separators are substituted for the fibrous tubes and porous separators currently used for this purpose in deep-discharge batteries. They provide for ease of assembly compared with the non-rigid, tubular separators.

In producing such ceramic, tubular separators, we adopt and modify practices and procedures from the art of ceramic body extrusion. Thus, a batch of raw materials is mixed to provide a homogeneous mass of suitable viscosity for extrusion. This mass is fed through an extruder with a die designed to extrude a continuous length of ceramic tubing.

Our preferred ceramic materials for ceramic separator purposes are composed of alumina or mullite alone or mixed with each other. Sources of these materials in powder form are mixed with methylcellulose, a dispersant, graphite and water to form extrudable mixtures. The mixtures are extruded in tubular form having a desired wall thickness, and are fired to produce porous, tubular separators.

Chemical durability is necessary since the separator is exposed to the electrolyte. The industry test used for a lead-acid battery separator involves exposure of the material to sulfuric acid solution of 1.28 specific gravity for 72 hours at 70° C. The material must exhibit a weight loss that is less than 5% to be acceptable. For convenience in coordinating testing, we have adopted a more stringent test that involves exposure to 40% sulfuric acid for 96 hours at 95° C. Further, we have required that weight loss in this more stringent test not exceed about 2%.

Finally, a porous material must have good wickability. This is a measure of the ability for the pores to take up electrolyte by capillary action. For example, a glass fiber mat separator typically will allow a sulfuric acid electrolyte to rise to a height of 7.5 cm (3") in a period of 3 minutes.

The ceramic material in the walls of an extruded separator has an inherent porosity of about 30–40%. However, a greater value is generally considered necessary to provide a sufficiently low impedance to produce a viable battery. A porosity greater than about 50% is preferred.

In order to enhance the porosity in an extruded ceramic, the batch prepared for extrusion may incorporate a combustible or evanescent filler in amounts up to about 75%. We prefer powdered graphite as the filler. When a body is extruded, it is fired to remove the filler, thereby enhancing the porosity of the body to values greater than 40%, preferably greater than 60%.

An electrical circuit, such as a battery, contains resistance (R), capacitance (C) and inductance (L). An impedance Z is defined to calculate the overall retarding effect on current of components with R, L or C. The impedance is critical to operation of a battery and expresses the system's slow response to a stimulus, namely the effect on current flow upon application of a stimulus (charging and discharging). Power (E in watts) in the direct current (DC) mode of batteries is defined as the product of the current (I in amperes) and the impedance (Z in ohms) for the DC components of the battery only. Impedance invariably reduces the theoretical voltage of a battery to a lower working voltage.

Successful battery performance requires ability to accept and maintain a charge. To this end, the impedance value must be relatively low. During battery formation a total energy input is targeted in terms of a fixed ampere-hours/pound (Ah/lb). This input must occur with the voltage in any cell not exceeding a certain level. Normal practice is to provide a total energy input of 185 Ah/lb while maintaining the impressed voltage below 2.7 volts. If the porosity of a separator is too low, the impressed voltage will exceed the permissible limit. This necessitates cutting back the energy input level, a situation that interferes with proper formation of the battery and increases manufacturing time and cost.

Heavy duty, lead-acid batteries are used as the power source in fork trucks, golf carts, other electrically powered road and service vehicles and marine applications. The primary requirement for these heavy duty batteries is to have good cycling capability. Most types of traction battery are guaranteed for 1200 cycles or five years service. Two types of battery design are widely used for this application, i.e. tubular and flat plate construction.

The positive plates in the tubular cell consist of a series of parallel porous tubes each having a centralized lead conductor surrounded by active material. The tubes are presently made from woven, braided, or felted fibers which are resistant to acid and the oxidizing environment of lead-acid batteries. The tubes may be used individually or stitched together (gauntlet construction) to produce a single structure with several tubes. The tubes are sealed at the base with a plastic bottom bar. Conventional negative electrodes and separators are used to complete the tubular design battery.

In the tubular battery cell design, the extruded, ceramic, tubular separators replace the current woven fiber gauntlet and the glass mat separator. An electrode construction is formed in the center of the extruded ceramic body. The exterior of the extruded body acts as the separator between the electrodes. The ceramic gauntlet/separator may be processed in a one piece construction to provide an active positive electrode using existing tubular battery technology.

The ceramic tubular construction can also be made in two pieces with channels which are pasted with active materials. The pasted halves are joined together and a centralized lead conductor spline incorporated to produce a tubular positive electrode/separator. Plastic holders may be used to cap and fasten the tubular body together. The ceramic body is tailored to the desired porosity and impedance to produce a battery with the desired deep-discharge characteristics.

Ceramic separators provide significant advantages for use in heavy duty commercial batteries. The materials can be processed into a variety of shapes and sizes with a wide range of porosity and pore sizes. These can be tailored to each battery's requirements.

The materials are strong and do not shred or break apart during normal use of the battery. The materials do not break while under compression and prevent active material from falling off the electrodes, thereby extending the life of the battery. The materials exhibit tortuous porosity which deters the ability of dendrites from moving through the separator and shorting the cell. The strength of the ceramic separators makes the materials ideal for automated processing and for use in either vertical or horizontal positions. The ceramic tubes also supply structural strength to the battery.

The use of the ceramic, tubular construction potentially revolutionizes the fabrication process of deep-discharge batteries. It significantly mechanizes the process of manufacturing, and improves performance by increasing energy and power densities.

FIG. 1 in the accompanying drawing is a side view in cross-section of a single tubular component 10 of a battery cell illustrating the invention. Component 10 embodies porous tubular body 12 which functions as a separator. Separator 12 is filled with a positive active material 14. This may be the material commonly employed as a porous coating for a positive electrode or grid. A metal wire or rod 16 is then inserted in the active material 14 of component 10 to function as the positive electrode. Normally, a complete cell in a battery will have a negative electrode on each side of component 10 or a series of such components.

Typically, a series of components 10 are combined to form an integrated electrode. The series may, for example, number 15–20. The individual electrodes 16 may be connected in known manner to form the integrated electrode.

FIG. 2 is a schematic, partial view of an integrated electrode. The FIGURE shows three components 10 electrically connected by a metal bar 18 to produce integrated electrode 20. The opposite ends of the components 10 may be held in a support member, for example, a molded plastic holder 22.

FIG. 3 is an exploded side view illustrating an alternative, two-piece construction for an individual tubular component 30. In component 30, the ceramic separator takes the form of channeled, semi-cylindrical bodies 32 which may be identical in shape and material. Channels 34 of bodies 32 are filled with positive active material 36 corresponding to that shown in FIG. 1 at 14. Likewise, metal electrode member 38 is embedded in material 36. Bodies 32 are then sealed together to form a component 30 corresponding to component 10.

A series of components 30 may then be assembled to form an integrated electrode in the manner described above. It will be appreciated that a gauntlet-type construction may be produced by molding bodies having multiple, parallel channels, rather than a single channel as shown.

FIG. 4 is a perspective view showing tubular component 30 as a unitary body formed by sealing together bodies 32.

SPECIFIC EMBODIMENTS

Development work has been largely carried out with our preferred materials, extruded alumina, mullite, or alumina/mullite mixtures. These materials have been mixed with graphite prior to extrusion. As noted earlier, the graphite burns out of the extruded material to provide bodies with improved porosities.

TABLE I shows batch compositions in parts by weight for a series of mixtures which, when extruded and fired, provide bodies composed of 33% mullite and 67% alumina.

TABLE I

| Batch Materials | 1 | 2 | 3 | 4 | 5 | 6 | 7 |
|---|---|---|---|---|---|---|---|
| Platelet clay | 16.66 | 14.13 | 11.63 | 9.14 | 7.80 | 5.82 | 4.16 |
| Stacked clay | 5.54 | 4.71 | 3.88 | 3.05 | 2.49 | 1.94 | 1.39 |
| Calcined clay | 27.61 | 23.47 | 19.34 | 15.19 | 12.42 | 9.66 | 6.90 |
| Alumina | 50.73 | 42.67 | 35.16 | 27.63 | 22.60 | 17.58 | 12.56 |
| Graphite | — | 15 | 30 | 45 | 55 | 65 | 75 |
| Methyl cellulose | 3 | 3 | 3 | 3 | 3 | 3 | 3 |
| Dispersant | 0.7 | 0.7 | 0.7 | 0.7 | 0.7 | 0.7 | 0.7 |
| Water | 27.5 | 27.5 | 27.5 | 27.5 | 27.5 | 27.5 | 27.5 |

The basic batches, prior to addition of graphite, were originally designed for preparation of support substrates exposed to temperature cycling. Accordingly, combinations of platelet, stacked and calcined clays (kaolin) were employed to control expansion effects by crystal orientation. The thermal expansion effects of the different clays, not of significance here, are explained in detail in U.S. Pat. No. 3,885,977 (Lachman et al.)

TABLE II shows batch compositions in parts by weight for a similar series of materials which, when extruded and fired, produce alumina bodies of varying porosity.

TABLE II

| Batch Materials | 8 | 9 | 10 | 11 |
|---|---|---|---|---|
| Alumina | 100 | 75 | 50 | 25 |
| Graphite | — | 25 | 50 | 75 |
| Methyl cellulose | 3 | 3 | 3 | 3 |
| Dispersant | 0.7 | 0.7 | 0.7 | 0.7 |
| Water | 27.5 | 27.5 | 27.5 | 27.5 |

TABLE III shows properties for fired, porous bodies produced from the batches shown in TABLES I and II.

TABLE III

| Example | MOR Mpa (psi) | Porosity (%) | Pore Size (Microns) |
|---|---|---|---|
| 1 | 51.2 (7400) | 40.4 | 0.49 |
| 2 | 27.6 (4010) | 50.7 | 0.60 |
| 3 | 14.9 (2160) | 58.6 | 1.17 |
| 4 | 6.7 (973) | 68.6 | 3.88 |
| 5 | 3.0 (431) | 72.5 | 5.30 |
| 6 | 1.75 (253) | 76.8 | 6.64 |
| 7 | 1.6 (232) | 82.1 | 8.43 |
| 8 | 28.7 (4180) | 40.3 | 1.07 |
| 9 | 7.4 (1080) | 57.1 | 1.91 |
| 10 | 3.1 (456) | 60.2 | 10.21 |
| 11 | <0.7 (<100) | 85.0 | 13.93 |

We claim:

1. In a deep discharge, rechargeable battery assembly, the improvement comprising a tubular, porous, ceramic separator for a positive electrode, the separator having a porosity greater than 50%.

2. In a deep-discharge battery assembly in accordance with claim 1, the improvement comprising a tubular separator wherein the ceramic is selected from alumina, mullite and mixtures thereof.

3. In a deep-discharge battery assembly in accordance with claim 1, the improvement comprising a tubular separator wherein the separator has a porosity greater than 60%.

4. In a deep-discharge battery assembly in accordance with claim 1, the improvement comprising a tubular separator comprising two annular, semi-cylindrical bodies of porous ceramic sealed together at their side peripheries.

5. In a deep-discharge battery assembly, the improvement comprising a tubular, porous, ceramic separator having a porosity of greater than 50%, a positive active material filling the interior of the separator, and a centralized conductor embedded and extending from the positive active material.

6. In a deep discharge battery assembly in accordance with claim 5, the improvement comprising a tubular, ceramic separator composed of a material selected from alumina, mullite, and mixtures thereof.

7. In a deep discharge battery assembly in accordance with claim 5, the improvement comprising a tubular ceramic separator having a porosity greater than 60%.

8. In a deep discharge battery assembly in accordance with claim 5, the improvement comprising a tubular, ceramic separator formed as two annular, semi-cylindrical bodies, each body filled with a positive active material, a centralized conductor embedded in the active material and the two bodies sealed together.

9. In a deep discharge battery assembly in accordance with claim 5, the improvement comprising a centralized conductor connected to a terminal common to a plurality of individual cells.

10. In a deep-discharge battery assembly, comprising a plurality of individual positive electrodes held in a mounting and having a common terminal, each individual positive electrode comprising a tubular separator having a positive active material filling the interior of the separator and a centralized conductor embedded in and extending from the positive active material, the improvement whereby the tubular separator is a porous, ceramic body having a porosity greater than 50%.

11. In a deep-discharge battery assembly in accordance with claim 10, the improvement wherein the porous, tubular separator is composed of a material selected from alumina, mullite and mixtures thereof.

12. In a deep-discharge battery assembly, in accordance with claim 10, the improvement wherein the tubular separator in at least one individual, positive electrode is formed as two annular, semi-cylindrical bodies, each body is filled with a positive active material, an electrical conductor is embedded in the active material and the two bodies are sealed together.

13. In a deep-discharge, light weight battery assembly, in accordance with claim 10, the improvement where the porous, ceramic separator provides a structural support for the battery.

14. In a deep-discharge battery assembly in accordance with claim 10, the improvement wherein the battery is a lead-acid battery.

15. In a deep-discharge battery assembly in accordance with claim 10, the improvement wherein the positive plate is a series of parallel, porous tubes.

16. In a deep-discharge battery assembly in accordance with claim 10, the improvement wherein the series of parallel, porous tubes are joined together in a gauntlet construction.

17. In a deep-discharge battery assembly in accordance with claim 10, the improvement wherein the porosity in the separator is sufficiently large that the impressed voltage, to obtain a total energy output of 185 Ah/lb., is below 2.7 volts.

18. In a deep-discharge battery assembly in accordance with claim 1, the improvement comprising a tubular separator comprising two unitary bodies of porous ceramic, each having multiple parallel semi-cylindrical channels and being sealed together at the channel peripheries.

* * * * *